(12) United States Patent
Slawson et al.

(10) Patent No.: US 7,577,718 B2
(45) Date of Patent: Aug. 18, 2009

(54) ADAPTIVE DISSEMINATION OF PERSONALIZED AND CONTEXTUALLY RELEVANT INFORMATION

(75) Inventors: Dean A. Slawson, Sammamish, WA (US); Raman Chandrasekar, Seattle, WA (US); Michael K. Forney, Bainbridge Island, WA (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 11/461,388

(22) Filed: Jul. 31, 2006

(65) Prior Publication Data

US 2008/0028036 A1 Jan. 31, 2008

(51) Int. Cl.
*G06F 15/16* (2006.01)
(52) U.S. Cl. .................. 709/218; 707/3; 707/7
(58) Field of Classification Search .............. None
See application file for complete search history.

(56) References Cited

U.S. PATENT DOCUMENTS 4,965,763 A 10/1990 Zamora (Continued)

FOREIGN PATENT DOCUMENTS

KR 20040091532 10/2004

(Continued)

OTHER PUBLICATIONS

U.S. Appl. No. 11/461,378, Chandrasekar et al.

(Continued)

*Primary Examiner*—Moustafa M. Meky
*Assistant Examiner*—Clayton R Williams
(74) *Attorney, Agent, or Firm*—Perkins Coie LLP

(57) ABSTRACT

An information dissemination system identifies the interests of a user from information derived from various sources, such as, by way of example, the user's calendar entries, emails, World Wide Web (web) usage information, documents, enterprise resource planning (ERP) data, and the like. The information dissemination system then creates a profile for the user, and includes in the profile the details about the user's interests including the information sources to query, the user events which were analyzed to determine the user's interest, the topics derived from the analyzed events, the queries generated for the analyzed events, a language model of terms that are relevant to the user, and other information regarding the user. The information dissemination system then periodically executes the queries against the appropriate information sources, ranks the search results obtained from executing the queries, and renders the ranked search results to the user.

20 Claims, 15 Drawing Sheets

U.S. PATENT DOCUMENTS

| | | | |
|---|---|---|---|
| 5,685,000 | A | 11/1997 | Cox, Jr. |
| 5,761,662 | A | 6/1998 | Dasan |
| 6,202,062 | B1 | 3/2001 | Cameron et al. |
| 6,266,668 | B1 | 7/2001 | Vanderveldt et al. |
| 6,321,158 | B1 | 11/2001 | DeLorme et al. |
| 6,421,675 | B1 | 7/2002 | Ryan et al. |
| 6,442,527 | B1 | 8/2002 | Worthington |
| 6,546,388 | B1 | 4/2003 | Edlund et al. |
| 6,594,682 | B2 | 7/2003 | Peterson et al. |
| 6,608,556 | B2 | 8/2003 | De Moerloose et al. |
| 6,640,230 | B1 | 10/2003 | Alexander et al. |
| 6,675,350 | B1 | 1/2004 | Abrams et al. |
| 6,778,973 | B2 | 8/2004 | Harlan |
| 6,802,042 | B2 | 10/2004 | Rangan et al. |
| 6,845,370 | B2 | 1/2005 | Burkey et al. |
| 6,907,423 | B2 | 6/2005 | Weil et al. |
| 6,920,459 | B2 | 7/2005 | Dedhia et al. |
| 6,920,616 | B1 | 7/2005 | Abbott et al. |
| 7,003,730 | B2 | 2/2006 | Dettinger et al. |
| 2002/0069190 | A1 | 6/2002 | Geiselhart |
| 2003/0037041 | A1 | 2/2003 | Hertz |
| 2003/0055689 | A1 | 3/2003 | Block et al. |
| 2003/0208485 | A1 | 11/2003 | Castellanos |
| 2004/0002945 | A1 | 1/2004 | Shibata |
| 2004/0002988 | A1 | 1/2004 | Seshadri et al. |
| 2004/0054550 | A1 | 3/2004 | Cole et al. |
| 2004/0181604 | A1 | 9/2004 | Immonen |
| 2004/0267700 | A1 | 12/2004 | Dumais et al. |
| 2005/0015307 | A1 | 1/2005 | Simpson et al. |
| 2005/0027704 | A1 | 2/2005 | Hammond et al. |
| 2005/0043060 | A1 | 2/2005 | Brandenberg et al. |
| 2005/0065919 | A1 | 3/2005 | Gotoh et al. |
| 2005/0071328 | A1 | 3/2005 | Lawrence |
| 2005/0149870 | A1 | 7/2005 | Van Ee et al. |
| 2005/0154723 | A1 | 7/2005 | Liang |
| 2005/0165739 | A1 | 7/2005 | Yamamoto et al. |
| 2005/0165762 | A1 | 7/2005 | Bishop |
| 2005/0216434 | A1 | 9/2005 | Haveliwala et al. |
| 2005/0240580 | A1* | 10/2005 | Zamir et al. ............... 707/4 |
| 2005/0246588 | A1* | 11/2005 | Deng et al. ............... 714/38 |
| 2005/0289140 | A1 | 12/2005 | Ford et al. |
| 2006/0004602 | A1 | 1/2006 | Silverbrook et al. |
| 2006/0004739 | A1 | 1/2006 | Anthony et al. |
| 2006/0010240 | A1 | 1/2006 | Chuah |
| 2006/0026152 | A1 | 2/2006 | Zeng et al. |
| 2006/0031216 | A1 | 2/2006 | Semple et al. |
| 2006/0047635 | A1* | 3/2006 | Kraenzel et al. ............ 707/3 |
| 2006/0047644 | A1 | 3/2006 | Bocking et al. |
| 2006/0064431 | A1 | 3/2006 | Kishore et al. |
| 2006/0074910 | A1 | 4/2006 | Yun et al. |
| 2006/0095412 | A1 | 5/2006 | Zito et al. |
| 2006/0106768 | A1 | 5/2006 | van Deursen |
| 2006/0123053 | A1 | 6/2006 | Scannell |
| 2006/0136405 | A1 | 6/2006 | Ducatel et al. |
| 2006/0230071 | A1 | 10/2006 | Kass et al. |
| 2007/0061243 | A1 | 3/2007 | Ramer et al. |
| 2007/0100796 | A1 | 5/2007 | Wang |
| 2007/0203938 | A1 | 8/2007 | Prahlad et al. |
| 2007/0239680 | A1 | 10/2007 | Oztekin et al. |
| 2007/0260624 | A1 | 11/2007 | Chung et al. |
| 2008/0005090 | A1* | 1/2008 | Khan et al. ............... 707/4 |
| 2008/0027921 | A1 | 1/2008 | Chandrasekar et al. |
| 2008/0027979 | A1 | 1/2008 | Chandrasekar et al. |
| 2008/0077558 | A1* | 3/2008 | Lawrence et al. ............ 707/3 |

FOREIGN PATENT DOCUMENTS

| | | |
|---|---|---|
| WO | WO 00/51042 | 8/2000 |
| WO | WO 2005/045690 | 5/2005 |

OTHER PUBLICATIONS

U.S. Appl. No. 11/461,383, Chandrasekar et al.

"Content Management Technology / Industry News," Content Technologies, News & Opinion, News for Jan. 2005, The Gilbane Group, 18 pages, http://gilbane.com/content_management_news.pl/2005/1/content_management_news.html [last accessed May 12, 2006].

Almgren, Magnus and Jenny Berglund, "Information Extraction of Seminar Information," CS224N: Final Project, pp. 1-12.

Bellotti, Victoria and Ian Smith, "Informing the Design of an Information Management System with Iterative Fieldwork," DIS'00, Brooklyn, New York, © 2000 ACM, pp. 227-237.

Brown, Peter J. and Gareth J. F. Jones, "Exploiting Contextual Change in Context-Aware Retrieval," SAC 2002, Madrid, Spain, © 2002 ACM, pp. 650-656.

Budzik, Jay et al., "Supporting Online Resource Discovery in the Context of Ongoing Tasks with Proactive Assistants," International Journal of Human-Computer Studies—Special Issue on Awareness and the WWW, pp. 1-30.

Chen, Guanling and David Kotz, "A Survey of Context-Aware Mobile Computing Research," Dartmouth Computer Science Technical Report TR2000-381, pp. 1-16.

Harada, Susumu and Shashikant Khandelwal, "Automatic Topic Extraction and Classification of Usenet Threads," Department of Computer Science, Stanford University, 8 pages.

Lin, Chin-Yew and Eduard Hovy, "Identifying Topics by Position," Information Sciences Institute of the University of Southern California, pp. 283-290.

Mackay, Wendy E., "More Than Just a Communication System: Diversity in the Use of Electronic Mail," Massachusetts Institute of Technology, © 1998 ACM, pp. 344-353.

Rhodes, B. J. and P. Maes, "Just-in-time information retrieval agents," IBM Systems Journal, vol. 39, Nos. 3&4, 2000, © 2000 IBM, pp. 685-704.

Soules, Craig A. N. and Gregory R. Ganger, "Connections: Using Context to Enhance File Search," SOSP'05, Oct. 2005, Brighton, United Kingdom, © 2005 ACM, 14 pages.

Wing, Wai-Kwong, Francis C.M. Lau and Cho-Li Wang, "Smart Retrieval and Sharing of Information Resources based on Contexts of User-Information Relationships," Department of Computer Science, The University of Hong Kong, 6 pages.

PCT International Search Report, International Application No. PCT/US2007/016439, Date of Mailing Dec. 4, 2007, 3 pages.

PCT International Search Report, International Application No. PCT/US2007/016507, Date of Mailing Jan. 11, 2008, 3 pages.

PCT International Search Report, International Application No. PCT/US2007/016508, Date of Mailing Dec. 14, 2007, 3 pages.

* cited by examiner

1402 {
- 1404 — o Travel advisory topic
- 1404 — o Slots: ToCity, ToCountry
- 1406 — o Recognizers: Your trip to <KnownCityName>, <KnownCountryName>
  [Assume KnownCityName is a list of city names from around the world; KnownCountryName is a list of country names.]; Any match to regular expression should bind the matched KnownCityName to ToCity and a match to KnownCountryName to ToCountry.
- 1408 — o Action: display instantiated URL or extract relevant paragraphs of information from
  http://travel.state.gov/travel/cis_pa_tw/tw/tw_1764.html
  if there is information about ToCountry (and/or ToCity).

Weather here (start city)
- o http://www.expedia.com/pub/agent.dll?qscr=wthr&wair=YYZ
- o http://www.weather.com/activities/travel/businesstraveler/?from=search_vert
- o http://www.weather.com/outlook/travel/tripbuilder?location=sea&month=00&day=20&location=lhr&month=00&day=21&buildTrip=y&error=rtEdit&x=36&y=14 [weather, what to pack]

Weather there (any intermediate city)
- o Same as the one for *start city*

Flight details (for each leg of the trip)
- o http://www.flytecomm.com/cgi-bin/trackflight People background (each person being met)
- o Web search on names Company background (for each company being met)
- o http://www.prnewswire.com/
- o http://www.onesource.com/custom/microsoft/ [needs subscription]

*FIG. 14*

ADAPTIVE DISSEMINATION OF PERSONALIZED AND CONTEXTUALLY RELEVANT INFORMATION

CROSS-REFERENCE TO RELATED APPLICATIONS

This application is related to U.S. patent application Ser. No. 11/461,378, entitled "Presenting Information Related to Topics Extracted from Event Classes," which was filed on even date herewith, and U.S. patent application Ser. No. 11/461,383, entitled "Temporal Ranking of Search Results," which was filed on even date herewith, the disclosures of which are incorporated by reference herein in their entireties.

BACKGROUND

The development of information systems, such as the Internet, and various on-line services for accessing the information systems, has led to the availability of increasing amounts of information. As computers become increasingly powerful and versatile, users are increasingly employing their computers for a broad variety of tasks. Accompanying the increasing use and versatility of computers is an increasing desire on the part of users to increasingly rely on their computing devices to perform their daily activities. For example, anyone with access to a suitable Internet connection may go "on-line" and navigate to the information pages (i.e., the web pages) to gather information that is relevant to the user's current activity.

Many search engine services, such as Google and Yahoo!, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on the closeness of each match, web page importance or popularity (e.g., Google's PageRank), and so on. The search engine service then displays to the user links to those web pages in an order that is based on a ranking determined by their relevance.

Unfortunately, users of the information systems encounter an information overload problem. For example, the search engine services often provide its user irrelevant search results, thus forcing the user to sift through a long list of web pages in order to find the relevant web pages. Compounding this problem is the constantly changing and expanding volume of information, and the difficulty users encounter in keeping abreast of the constantly changing information to determine the information that is credible and relevant to the user.

SUMMARY

A method and system for adaptively disseminating personalized and contextually relevant information is provided. An information dissemination system identifies the interests of a user from information derived from various sources, such as, by way of example, the user's calendar entries, emails, World Wide Web (web) usage information, documents, enterprise resource planning (ERP) data, and the like. The information dissemination system then creates a profile for the user, and includes in the profile the details about the user's interests including the information sources to query, the user events which were analyzed to determine the user's interest, the topics derived from the analyzed events, the queries generated for the analyzed events, a language model of terms that are relevant to the user, and other information regarding the user. The information dissemination system then periodically executes the queries against the appropriate information sources, ranks the search results obtained from executing the queries, and renders the ranked search results to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 14 is an example data listing that illustrates an event class, according to some embodiments.

DETAILED DESCRIPTION

Figure 1:
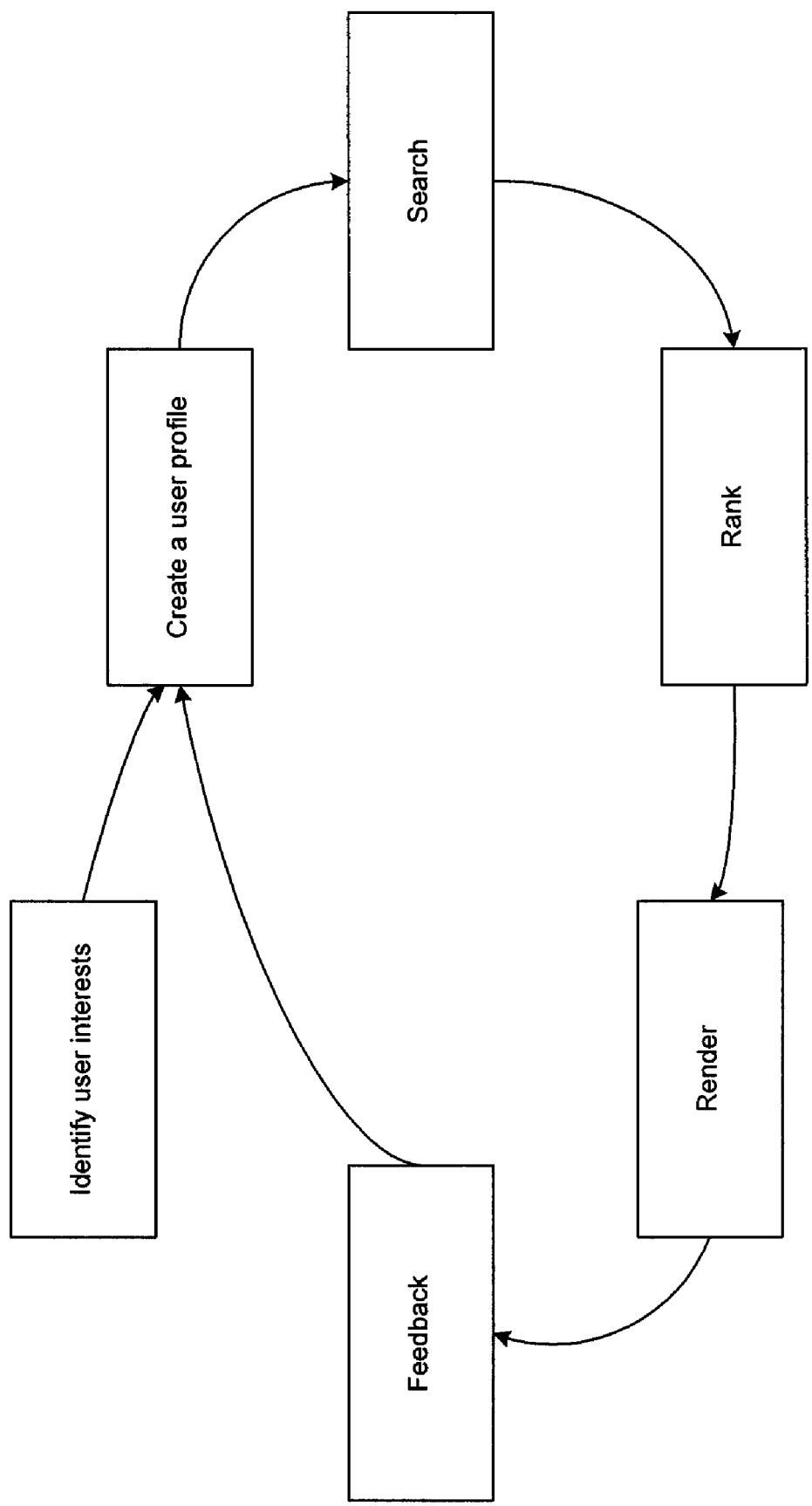
FIG. 1 is a block diagram that illustrates the processing of the information dissemination system, according to some embodiments.

A method and system for adaptively disseminating personalized and contextually relevant information is provided. In some embodiments, an information dissemination system identifies the interests of a user and adaptively disseminates to the user the information that is relevant to the user's interests. The user's interests may be identified from information derived from various sources, such as, by way of example, the user's calendar entries, email messages, World Wide Web (web) usage information, documents, enterprise resource planning (ERP) data, and the like. The information dissemination system then creates a profile for the user, and includes in the profile the details about the user's interests. For example, the information dissemination system may include in the user's profile information regarding: the information sources to query for information to render to the user; the user events (e.g., meetings, appointments, etc.) which were analyzed to determine the user's interests; the topics derived from the analyzed events; the queries generated for the analyzed events; a language model of terms that are relevant to the user; the user's preferences for receiving the relevant information; and other information regarding the user. Generally, the topic can be defined as any cohesive concept of the event. For example, for a conference that the user is scheduled to attend, the topics may include the subject of the conference, the people presenting in the conference, the people attending the conference, the location of the conference, the organizations represented at the conference, travel information for the user (e.g., origination city, destination city, travel mode, flight numbers, hotel reservations, rental car reservations, etc.), and weather information. The terms that are relevant to the user may be derived from the various sources used to identify the user's interests. The information dissemination system periodically executes the queries in the user's profile against the appropriate information sources and obtains the search results. As used herein, the term "search result" or any variant thereof generally refers to results which are filtered using a query. The information dissemination system then ranks the search results according to various factors, and renders the ranked search results to the user. The information dissemination system obtains feedback from the user regarding the rendered search results and incorporates the feedback into the user's profile. The information dissemination system may provide a user interface (UI) through which the user can view and/or modify the details of the user's interests maintained in the user's profile. For example, a user may use the UI to specify the level of importance and/or relevance of the events, topics, terms, information sources, and other information included the user's profile. The information dissemination system may also monitor the user's interaction with the rendered search results and make appropriate modifications to the details of the user's interests maintained in the user's profile. The information dissemination system may also periodically update the user's profile with more recent or updated details about the user's interests. In this manner, the information dissemination system, over time, becomes increasingly responsive to the user's information needs.

In some embodiments, the information dissemination system identifies key terms from the terms that are relevant to a user and generates the queries from the key terms. The information dissemination system can identify the key terms from the terms extracted from the user's messages and events contained in selected folders. By way of example, the information dissemination system may scan the user's recent email folders (e.g., inbox folder and sent items folder) and extract the terms from these email folders. The information dissemination system can then identify the emails in the other folders that are related to the extracted terms, and extract the terms from these related emails. Using the extracted terms, the information dissemination system creates clusters of terms that are similar. Each cluster is associated with a set of terms. The information dissemination system then identifies events, such as the user's appointments by scanning the entries in a calendaring application, and, for each event, identifies the clusters associated with the event. The information dissemination system then creates one or more topics for each event. Each topic may be considered a "container" that contains information that is relevant to its associated event, such as an event name, an event duration, etc. The information dissemination system identifies the key terms in the identified clusters and generates a query from the key terms. The information dissemination system then places the generated query into the topic that is associated with the event, and includes the topic in the user's profile.

The information dissemination system may use various techniques to generate the clusters of terms. In some embodiments, the information dissemination system uses a K-means algorithm. The information dissemination system provides to the algorithm a number K that specifies the desired number of clusters. In the first pass, the algorithm takes the first K terms as the centroid of a unique cluster. The centroid is the mean position of the cluster (e.g., the mean position of the terms in the cluster). The algorithm then assigns each of the remaining terms to the cluster with the closest centroid to the term (e.g., the cluster where the difference between the centroid and the term is minimized). In the subsequent passes, the algorithm recomputes the cluster centroids based the previous pass and then reassigns each term to the cluster with the centroid that is closest to the term. The algorithm may be performed for a fixed number of passes (e.g., three) or until the clustering converges on a solution. The information dissemination system may use any of a variety of well-known algorithms, including maximum likelihood estimation, spectral clustering, and so on, to generate the clusters of terms.

In some embodiments, the information dissemination system identifies the key terms in a cluster based on an overall weight assigned to each term. The overall weight of a term may be derived from a combination of a type weight of the term and a relevance weight of the term. The information dissemination system first filters the terms to reduce the number of terms that may be identified as key terms. For example, the information dissemination system may filter out the terms that are Uniform Resource Locators (URLs), and terms that are made up of numbers in order to reduce the number of candidate key terms. For each of the remaining terms, the information dissemination system can calculate a type weight and a relevance weight. The type weight is a weight that is assigned to a term based on the type of the term. For example, the information dissemination system may assign a larger type weight to a term that is a name, such as a name of a person, than to a term that is comprised of multiple words. A term that is comprised of multiple words may in turn be assigned a larger type weight than a term that is a single word. The information dissemination system may also assign different type weights to a term based on whether the term appears as part of the subject text, body text, contacts text, or other parts of the event. The relevance weight of a term is a measure of relevance of the term to the user and, in particular, to the user's interests. One common technique for determining the relevance of the term to the user is based on term frequency and inverse document frequency (TF*IDF). Term frequency refers to the number of occurrences of a term within a document, and the inverse document frequency refers to the inverse of the number of documents that contain that term. In this instance, the documents generally refer to the various information sources used to identify the user's interests. The information dissemination system may identify the terms that are over represented and the terms that are underrepresented as terms that are of unlikely relevance to the user. To each of these terms, the information dissemination system assigns a low relevance weight. To each of the remaining terms, the information dissemination system can assign a relevance weight based upon the term's TF*IDF metric. The information dissemination system may use any of a variety of other well-known techniques for determining the relevance of a term. The information dissemination system may then derive an overall weight for a term based on the term's type weight and relevance weight. For example, the overall weight of a term may be derived by multiplying the type weight and the relevance weight of the term. In some embodiments, the overall weight of a term may be derived from the term's relevance weight. The information dissemination system may then identify as key terms the terms whose overall weights are above a predetermined threshold. The information dissemination system may maintain the terms and their assigned weights in the user's profile, for example, as part of the language model.

In some embodiments, the information dissemination system generates a query from the key terms by using the highest six ranking key terms. The information dissemination system first ranks the key terms based on the overall weights assigned to the key terms. The information dissemination system then identifies the highest six ranking key terms and generates the query by the following equation:

$$\text{Query}=A \text{ AND } B \text{ AND } (C \text{ OR } D \text{ OR } E \text{ OR } F) \quad (1)$$

where A represents the highest ranking key term, B represents the second highest ranking key term, C represents the third highest ranking key term, D represents the fourth highest ranking key term, E represents the fifth highest ranking key term, and F represents the sixth highest ranking key term. In instances where there are less than six key terms, the information dissemination system may generate the query using the number of available key terms. For example, if there are only four key terms, the information dissemination system can generate the query by omitting the fifth and sixth highest ranking key terms in equation (1) above. Examples of other suitable queries where there are less than six key terms include: Query=A; Query=A AND B; Query=A AND B AND C; Query=A AND B AND (C OR D); etc.

In some embodiments, the information dissemination system incrementally generates topics that may be of interest to a user. For example, the user may provide an indication that some event is newsworthy (i.e., of interest to the user). Upon receiving the indication, the information dissemination system identifies a user interest. For example, the information dissemination system can identify a topic from the specified event as being of interest to the user. Any one of the other topics that are related to the specified event may also be identified as the user interest. The information dissemination system then extracts the terms that are associated with the topic and, from these terms, identifies the key terms. The information dissemination system can identify the key terms based on the overall weights assigned to the terms, as described above. The information dissemination system then generates a query from the key terms and includes the query in the user's profile for execution. The information dissemination system may also maintain the extracted terms and their assigned weights in the user's profile, for example, as part of the language model.

The information dissemination system garners information for a user at periodic intervals. At a periodic interval, the information dissemination system executes the queries against the information sources specified in the user's profile to obtain search results. The information sources may include MSN Search, MSN News Search, and other information sources which index blogs, news feeds, web pages, document sources, webcasts, videocasts, audiocasts, etc., and which makes the search results available via an interface. The information dissemination system then generates a ranked list of information items by ranking the items of information included in the search results. The information dissemination system then renders the ranked search results to the user. The information dissemination system initializes the periodic intervals to default values, which may be modified by the user. In some embodiments, the information dissemination system garners information related to events that are within a time range, such as a date range. For example, the information dissemination may initialize the date range to one week (e.g., a period of seven days starting from the day before the current day (today)). In this instance, the information dissemination system garners information by executing the queries generated for the topics corresponding to the events that are within the date range. In some embodiments, the information dissemination system allows the user to initiate the garnering of information. For example, the information dissemination system may provide a UI through which the user can specify a date range of interest and request the garnering of information.

In some embodiments, the information dissemination system ranks the search results based on a total weight assigned to each search result. The total weight of a search result may be derived from a combination of a static weight of the search result, an adaptive weight of the search result, and a temporal weight of the search result. The static weight may be derived from various weighting factors such as the importance of the topic/event to the user, the importance of the information source, the ranking provided by the information source, and the relevance of the terms to the user's interests. For example, a static weight for a search result may be a combination of the importance of the topic that corresponds to the search result, the importance of the information source that produced the search result, the rank provided by the information source that produced the search result, and the relevance of the terms in the search result to the user's interests. The relevance of the terms may be determined using the language model included in the user's profile. For example, a cosine similarity measure can be employed to measure the similarity of the terms in the search result to the terms in the language model. The adaptive weight is a weight that is assigned to a search result based on user preferences and/or feedback. For example, the user may specify additional information sources from which to retrieve information. The user may indicate a preference order for the information sources. The user may also indicate a preference for a certain type of search result over another type of search result. The information dissemination system may also discern the user's preferences by monitoring the user's interactions with the information dissemination system and, in particular, the information rendered by the information dissemination system. The information dissemination system may maintain information regarding the user's preferences and interactions in the user's profile. The temporal weight is a weight that is assigned to a search result based on the proximity of the event that corresponds to the search result. Temporal weighting is further discussed below. The information dissemination system may then derive a total weight for each search result based on the search result's static weight, adaptive weight, and temporal weight. For example, the total weight of a search result may be derived by adding the static weight, adaptive weight, and temporal weight of the search result. The information dissemination system then ranks the search results according to their total weights and renders the ranked list of search results. In some embodiments, the information dissemination system renders only a predetermined number of search results. For example, the information dissemination system may only render the highest twenty ranking search results.

In some embodiments, the information dissemination system may alert users regarding highly relevant search results. The information dissemination system may alert a user by providing an indication on the user's client computing device. For example, the information dissemination system may cause a particular icon or indicator to appear on a UI on the user's client computing device. The information dissemination system may also vary the color of a displayed icon or indicator to indicate the presence of search results of varying relevance. For a user using a mobile client computing device, such as smart phone, the information dissemination system may send the user a text message informing the user of the presence of relevant search results.

Temporal Ranking

Temporal ranking is based on the notion that the importance of information varies with time. By way of example, a user may have two events scheduled in the user's calendar: a first event regarding a meeting next week in New York, and a second event regarding the flight to New York for this meeting. At some point in time prior to the meeting, the importance of the meeting event will be high (i.e., of interest to the user), and any information items (e.g., news) related to the meeting event will also be high. As the time approaches the flight event, the flight event also increases in importance, and information items related to the flight event, such as flight delay information, also increases in importance. Once the user takes the flight and lands in New York, the flight event will have vastly diminished in importance to the user, and related information items may no longer be of interest to the user. As can be seen from this example, the events have importance to the user, and information items related to the events also have importance to the user, but this importance varies according to time and, more specifically, the proximity to the events.

In some embodiments, the information dissemination system ranks the search results based on a temporal weight assigned to each search result. The temporal weight is an indication of importance of a search result to a user that varies with time. For each search result, the information dissemination system calculates a temporal weight that is based on the temporal proximity of the event that is related to the search result. The value of the temporal weight of a search result may increase (e.g., rise) exponentially in the time period before the start of the related event. During the related event, the value of the temporal weight may remain relatively constant (e.g., flat), or may rise to a peak at a point in time during the related event and decrease thereafter. In the time period after the end of the related event, the value of the temporal weight may decrease (e.g., drop) exponentially to zero in a very short amount of time. The value of the temporal weight may be calculated using an exponential function of the following form:

$$f(t)=k^*\exp(-m^*rti) \quad (2)$$

where rti represents a time interval (e.g., time from the current time to the start of the event) compared to the length of the event (e.g., T2−T1, where T2 is the end time of the event and T1 is the start time of the event), and k and m are weight factors whose values are chosen to vary the shape of the function as desired. The values chosen for the weight factors k and m may be different before, during, and after the event. The values of the weight factors may also be adjusted to generate specific temporal weight values for specific points in time. For example, the values of the weight factors can be chosen to generate a temporal weight value that is, by way of example, $\frac{1}{3}^{rd}$ of the maximum temporal weight value at a point in time that is T2−T1 (i.e., the duration or length of the event) from T1 (i.e., the start of the event).

In some embodiments, the information dissemination system calculates a temporal weight of a search result using the following equations:

if the current time is before the start of the event related to the search result, $$TW=BEWF^*\text{TimeWeight}(2.0^*(T1-TN)/(TD^*TF)) \quad (3)$$

if the current time is during the event related to the search result, $$TW=DEWF^*\text{TimeWeight}(1.0^*(((T1+T2)/2))-TN/(TD^*TF)) \quad (4)$$

if the current time is after the end of the event related to the search result, $$TW=AEWF^*\text{TimeWeight}(4.0^*(TN-T2)/(TD^*TF)) \quad (5)$$

where TN is the current time, T1 is the time the event starts, T2 is the time the event ends, TD is the length in time of the event, BEWF is a weight factor before the event, DEWF is a weight factor during the event, AEWF is a weight factor after the event, TF is a weight factor, and TimeWeight is the following function:

$$\text{TimeWeight}(x)=\exp(-1.0^*abs(x)) \quad (6)$$

where exp represents the exponential function "e", and abs represents the absolute value function. The values assigned to the weight factors BEWF, DEWF, AEWF, and TF control the rate of the rise and the rate of the decline of the temporal weight. In some embodiments, the information dissemination system may vary the values that are assigned to the weight factors depending on factors such as the duration of the event, the importance of the event, etc.

Event Classes

In some embodiments, the information dissemination system allows for the creation of event classes and disseminates information related to topics extracted from the event classes. Event classes can generally be thought of as scripts that specify topics and actions for obtaining information related to the topics. An event class can be written in any of a variety of well-known data description languages such as Extensible Markup Language (XML), etc. Event classes are executed to obtain information related to the particular event class. In some embodiments, the information dissemination system may provide a UI through which an authorized user, such as a system administrator, can create an event class. To create an event class, the user can use the UI to specify an event class recognizer, a set of special topics, and, for each specified special topic, a set of slots, a slot recognizer for each slot in the set of slots, and a set of actions. The event class recognizer allows for the identification of the corresponding event class. The event class recognizer may be specified in the form of heuristics, regular expressions, patterns, or other suitable rules that may be executed to identify its corresponding event class. The set of special topics define the relevant ideas for its corresponding event class. For example, a special topic may be created for a travel advisory, a weather advisory, a meeting, a dining experience at a restaurant, and various other events or concepts of events. Each slot is a parameter (i.e., a placeholder) that describes an attribute of its corresponding special topic. For example, to create a travel advisory special topic, the user may specify slots for an originating city ("FromCity"), a destination city ("ToCity"), one or more connecting cities, an airline carrier, a flight number, a date, and the like. To create a meeting special topic, the user may specify slots for a subject of the meeting, invited attendees in the meting, represented companies, and the like. The slot recognizer allows for the recognition or identification of a value or "slot filler" for its corresponding slot. The slot recognizer may be specified in the form of heuristics, regular expressions, information extraction routines, or other suitable rules that may be executed to identify the appropriate slot filler for the corresponding slot. For example, a slot recognizer for a FromCity slot in a travel advisory special topic may specify a restriction or limitation that the FromCity slot can only be filled with a name of a city recognized from a standard or specified list of city names. The information dissemination system can then execute the slot recognizer on a set of relevant calendar items, emails, and other information sources of the user to determine the value for the slot limited to any specified restriction. The specified actions are invoked to obtain the information corresponding to its special topic. The action may be specified as a parameterized URL (i.e., a URL having one or more parameters) that is to be instantiated and invoked. To instantiate a parameterized URL, the information dissemination system first determines a value for each of the parameters included in the URL, and then substitutes the parameters with its corresponding values. The action may also be specified as a URL. In some embodiments, the user may specify rules for digesting and extracting relevant information from the information that is obtained by performing the specified actions.

To disseminate the information related to an event class, the information dissemination system first identifies a user event that is of interest to a user. The information dissemination system may identify the user event from the user's profile. The information dissemination system then executes the defined event class recognizers to determine if the user event "fits into" one of the created event classes. Executing the defined event class recognizers may not result in the identification or determination of an event class for the user event. The information dissemination system may allow the user to specify an event class for the user event. Upon determining the event class to execute, the information dissemination system identifies the special topics that have been defined for the event class and the slots that have been defined for each special topic. The information dissemination system then identifies the slot recognizers that have been defined for each of the slots and executes each slot recognizer against the various sources of user information and interests, such as the user's emails, appointments, calendar items, etc., to identify the slot filler for the corresponding slot. The information dissemination system also instantiates any parameterized actions by identifying the slot filler values for and substituting the values in the appropriate places. The information dissemination system then performs the actions defined for the special topic, obtains the action results, and renders the action results to the user. For example, the information dissemination system may instantiate and invoke the defined URLs, and display the results from invoking the URLs. In some embodiments, the information dissemination system may digest the action results to identify the relevant information and render the relevant information to the user. In some embodiments, the information dissemination system may rank the action results and renders the ranked action results to the user.

FIG. 1 is a block diagram that illustrates the processing of the information dissemination system, according to some embodiments. The information dissemination system identifies the interests of a user, garners information that is based on the identified user interests, ranks the garnered information, and renders the ranked information to the user. For each user, the information dissemination system first identifies the user's interests and determines the overall and event-specific topics. The user's interests may be identified using information derived from the user's calendar, emails, related documents, etc., and the topics may be determined using various clustering techniques. The information dissemination system then automatically creates a profile for the user. The information dissemination system may include in the profile information such as the sources of information to search to obtain the information to render to the user, the events which were analyzed and the topics that were generated, a language model that is augmented with user experience with the information dissemination system, as well as other information regarding the user. Using the information sources and topics specified in the user's profile, the information dissemination system periodically searches for and collates the search results containing information that is potentially relevant to the topics. The information dissemination system then ranks the search results based on various factors, such as, topic weights, rankings provided by the information sources, the proximity to events, and user feedback information. The information dissemination system then renders the ranked search results to the user. The information dissemination system then obtains user feedback information by monitoring the user's interaction with the rendered search results and the information dissemination itself. The information dissemination system then incorporates the feedback information into the user's profile. By incorporating the feedback information into the user's profile, the information dissemination system is able to incorporate the feedback into subsequent searches and the ranking of the search results, thus becoming increasingly more responsive to the user's information needs.

Figure 2:
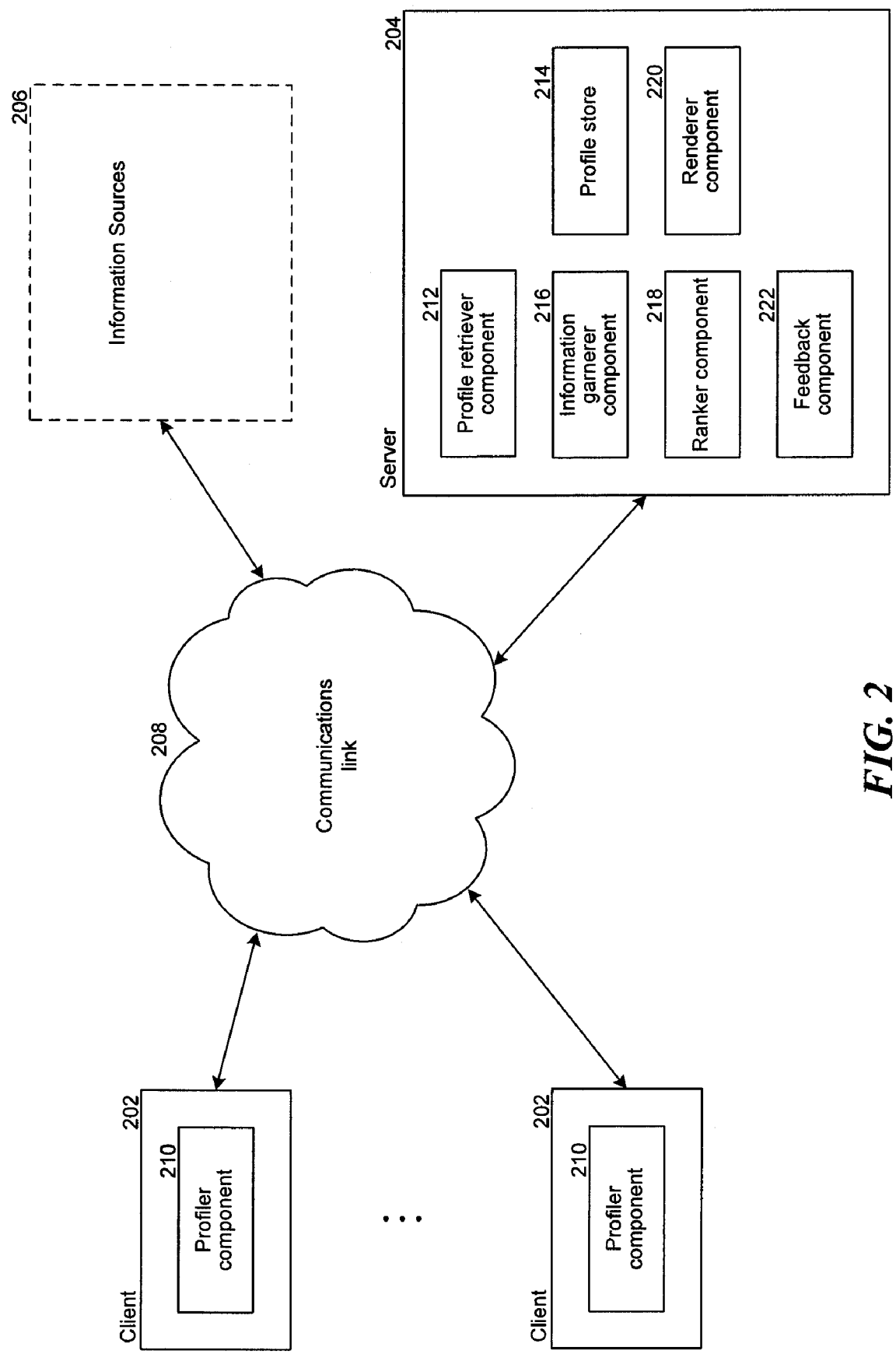
FIG. 2 is a block diagram that illustrates selected components of the information dissemination system, according to some embodiments.

FIG. 2 is a block diagram that illustrates selected components of the information dissemination system, according to some embodiments. The information dissemination system may include both client components that execute on user computing devices, and server components that execute on a server. As depicted, client devices 202, a server 204, and information sources 206 are each coupled to a communications link 208. The client devices correspond to computing devices used by users to interact with the information dissemination system. Each client device comprises a profiler component 210. When a user first registers with the information dissemination system, the profiler component is invoked to identify the interests of the user and to automatically create a profile for the user. The profiler component may then be periodically invoked to update the information regarding the user's interests maintained in the user's profile. The profiler component is also invoked to incrementally generate topics that may be of interest to the user. The server comprises a profile retriever component 212, a profile store 214, an information garnerer component 216, a ranker component 218, a renderer component 220, and a feedback component 222. The profile retriever component is invoked to obtain the user profiles from the client devices. The profile store contains the user profiles. The information garnerer component is invoked at periodic intervals to garner information from appropriate information sources according to information contained in the user profiles. The information garnerer component typically searches the information sources using the queries specified in the user profiles. The ranker component is invoked to rank the garnered information (e.g., search results). The renderer component is invoked to render ranked search results to appropriate users. The feedback component is invoked to obtain user feedback information and to augment the information in the user profiles with the user feedback information. Although not shown in FIG. 2, the client devices include components of the information dissemination system to allow users interact with the information dissemination system to, for example, view and modify the contents of user profiles, receive notifications and alerts regarding the availability of information, and to display and view the rendered information. Similarly, the server also includes components of the information dissemination system to define event classes and to execute the event classes.

The computing device on which the information dissemination system is implemented may include a central processing unit, memory, input devices (e.g., keyboard and pointing devices), output devices (e.g., display devices), and storage devices (e.g., disk drives). The memory and storage devices are computer-readable media that may contain instructions that implement the information dissemination system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the information dissemination system, including the information dissemination client and the information dissemination server may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The information dissemination system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
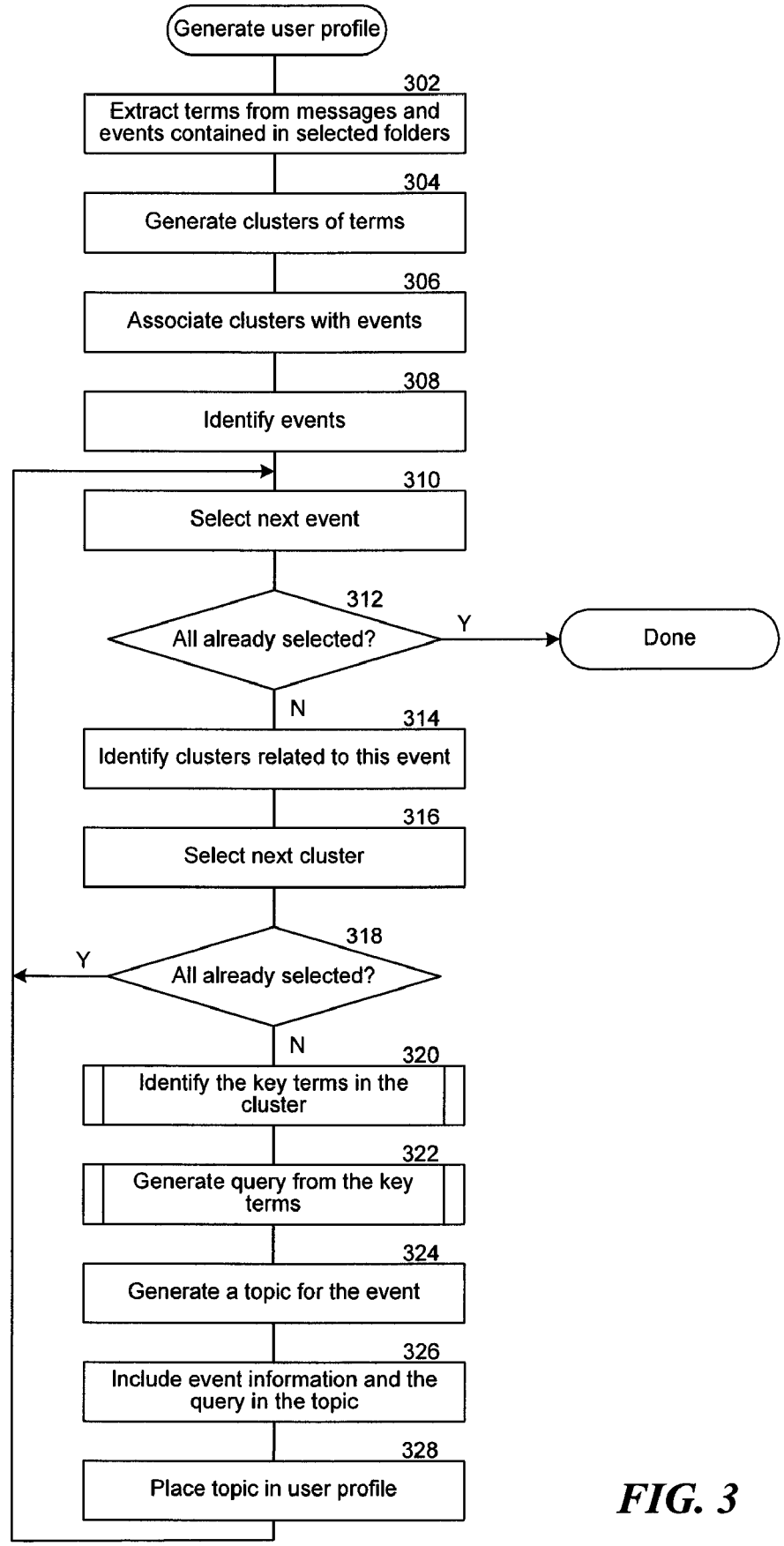
FIG. 3 is a flow diagram that illustrates the processing of the profiler component, according to some embodiments.

FIG. 3 is a flow diagram that illustrates the processing of the profiler component, according to some embodiments. The profiler component periodically identifies the interests of a user to create or update the user's profile with the information regarding the user's interests. In block 302, the profiler component extracts the terms from messages and events contained in selected folders, such as the user's email folders. In block 304, the profiler component generates clusters of similar terms. In block 306, the profiler component associates the clusters with the events. In block 308, the profiler component identifies the user's events, such as the user's appointments. In block 310, the profiler component selects the next identified event. In decision block 312, if all of the identified events have already been selected, then the profiler component completes, else the profiler component continues at block 314. In block 314, the profiler component identifies the clusters that are related to the event. In block 316, the profiler component selects the next identified cluster. In decision block 318, if all of the identified clusters have already been selected, then the profiler component loops to block 310 to select the next identified event, else the profiler component continues at block 320. In block 320, the profiler component identifies the key terms in the identified cluster. In block 322, the profiler component generates a query from the key terms. In block 324, the profiler component generates a topic for the event and, in block 326, includes the information regarding the event and the generated query in the topic. In block 328, the profiler component places the topic in the user's profile, and then loops to block 310 to select the next identified event. If a profile does not exist for the user, then the profiler component creates a profile for the user.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 4:
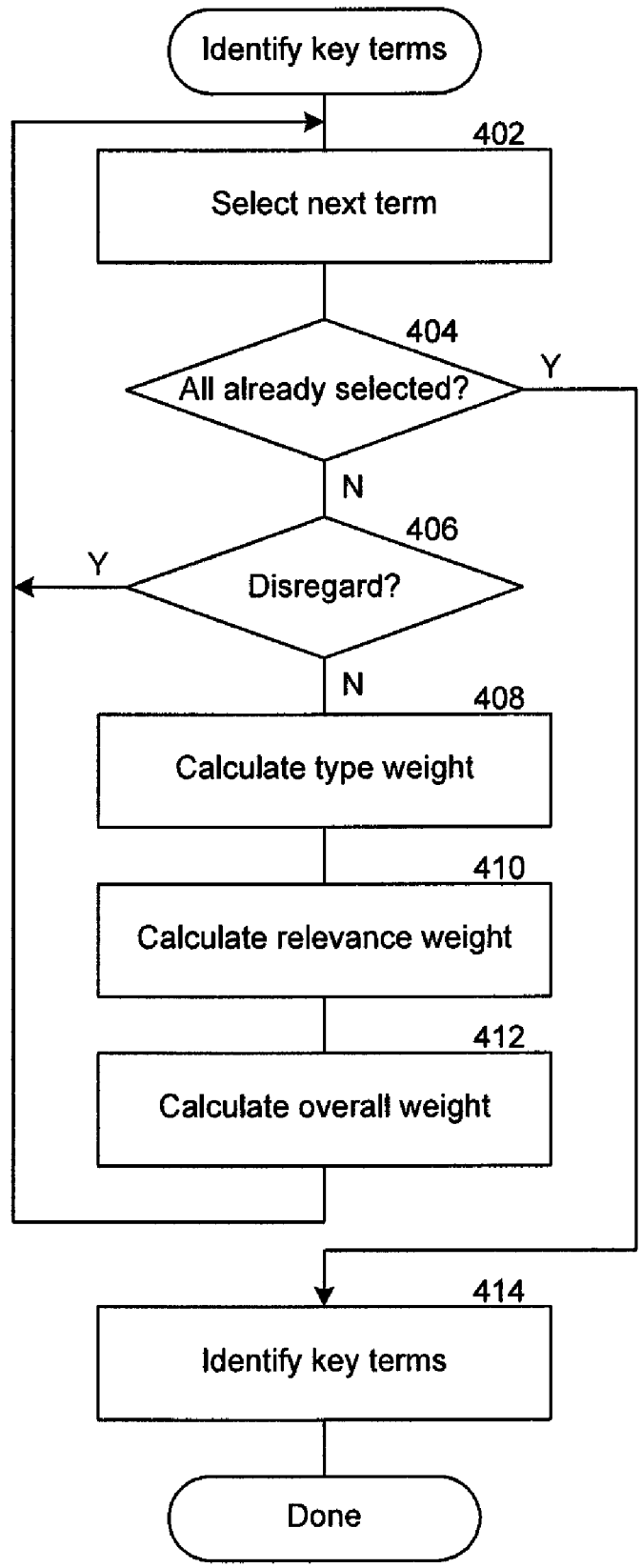
FIG. 4 is a flow diagram that illustrates the processing of the profiler component to identify key terms, according to some embodiments.

FIG. 4 is a flow diagram that illustrates the processing of the profiler component to identify key terms, according to some embodiments. For example, the profiler component can identify the key terms from the terms that are contained in an event description or an email message. The profiler component identifies the key terms based on an overall weight assigned to each term. In block 402, the profiler component selects the next term. The profiler component can select the term using any of a variety of well-known tools such as a lexical analysis system. In decision block 404, if all of the terms have already been selected, then the profiler component continues at block 414, else the profiler component continues at decision block 406. In decision block 406, if the term should be eliminated as a potential key term, then the profiler component loops to block 402 to select the next term, else the profiler component continues at block 408. In block 408, the profiler component calculates a type weight for the term. In block 410, the profiler component calculates a relevance weight for the term. In block 412, the profiler component calculates an overall weight based on the type weight and the relevance weight and assigns the overall weight to the term, and then loops to block 402 to select the next term. In block 414, the profiler component identifies the key terms based on the overall weights assigned to the terms, and completes.

Figure 5:
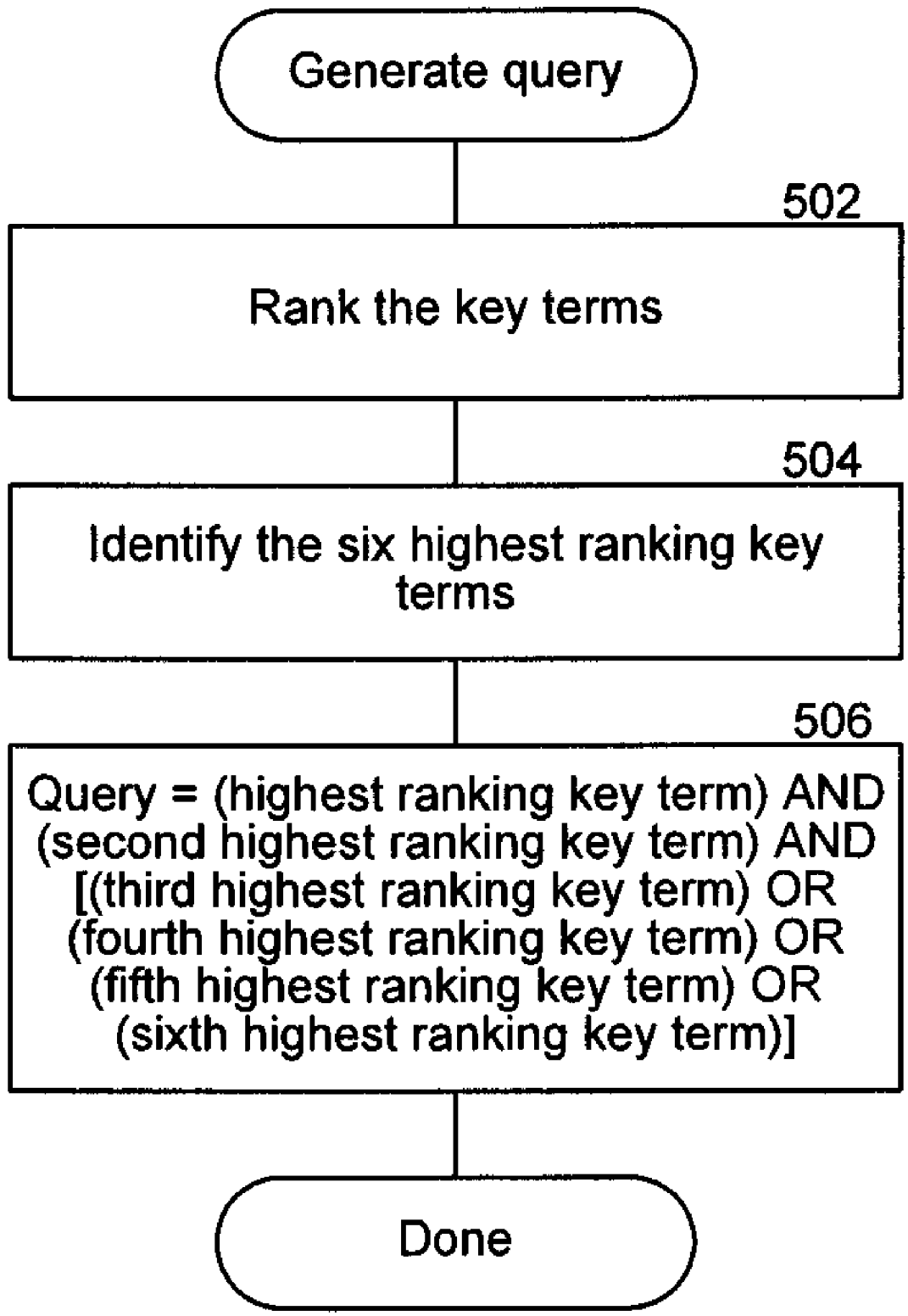
FIG. 5 is a flow diagram that illustrates the processing of the profiler component to generate a query, according to some embodiments.

FIG. 5 is a flow diagram that illustrates the processing of the profiler component to generate a query, according to some embodiments. The profiler component generates a query from the key terms. In block 502, the profiler component ranks the key terms based on their overall weights. In block 504, the profiler component identifies the six highest ranking key terms. In block 506, the profiler component generates a query from the identified six highest ranking key terms using Equation 1, and completes. In other embodiments, the profiler component may generate a query using a different number of the highest ranking key terms.

Figure 6:
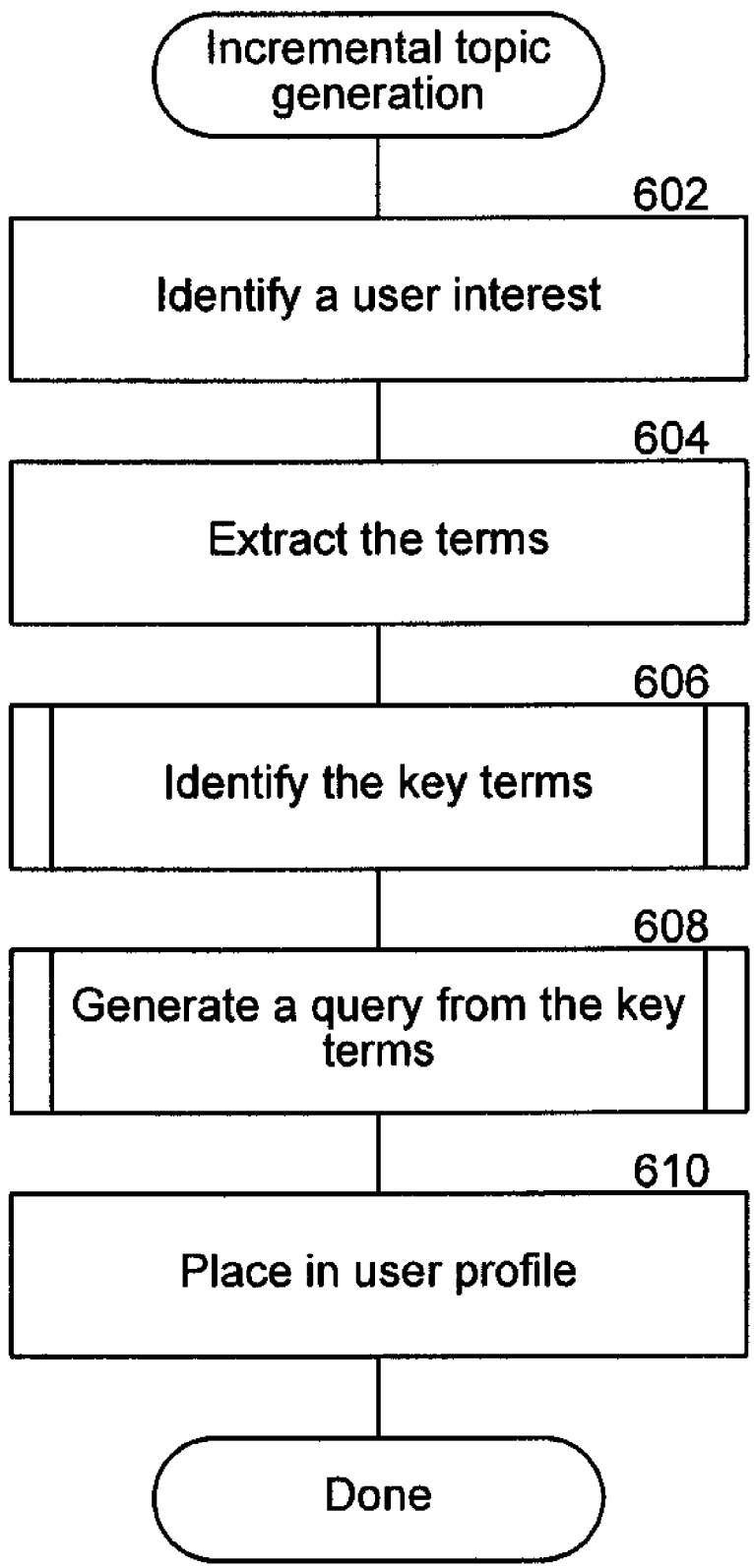
FIG. 6 is a flow diagram that illustrates the processing of the profiler component to incrementally generate a topic, according to some embodiments.

FIG. 6 is a flow diagram that illustrates the processing of the profiler component to incrementally generate a topic, according to some embodiments. The profiler component receives an indication that an event is of interest to a user. For example, the user may specify that the event is newsworthy and submit a request to receive information related to the specified event. In block 602, the profiler component identifies a user interest, such as a relevant message or an event. In block 604, the profiler component extracts the terms associated with the identified user interest. In block 606, the profiler component identifies the key terms from the extracted terms. In block 608, the profiler component generates a query from the key terms. In block 610, the profiler component places the query in the user's profile, and completes.

Figure 7:
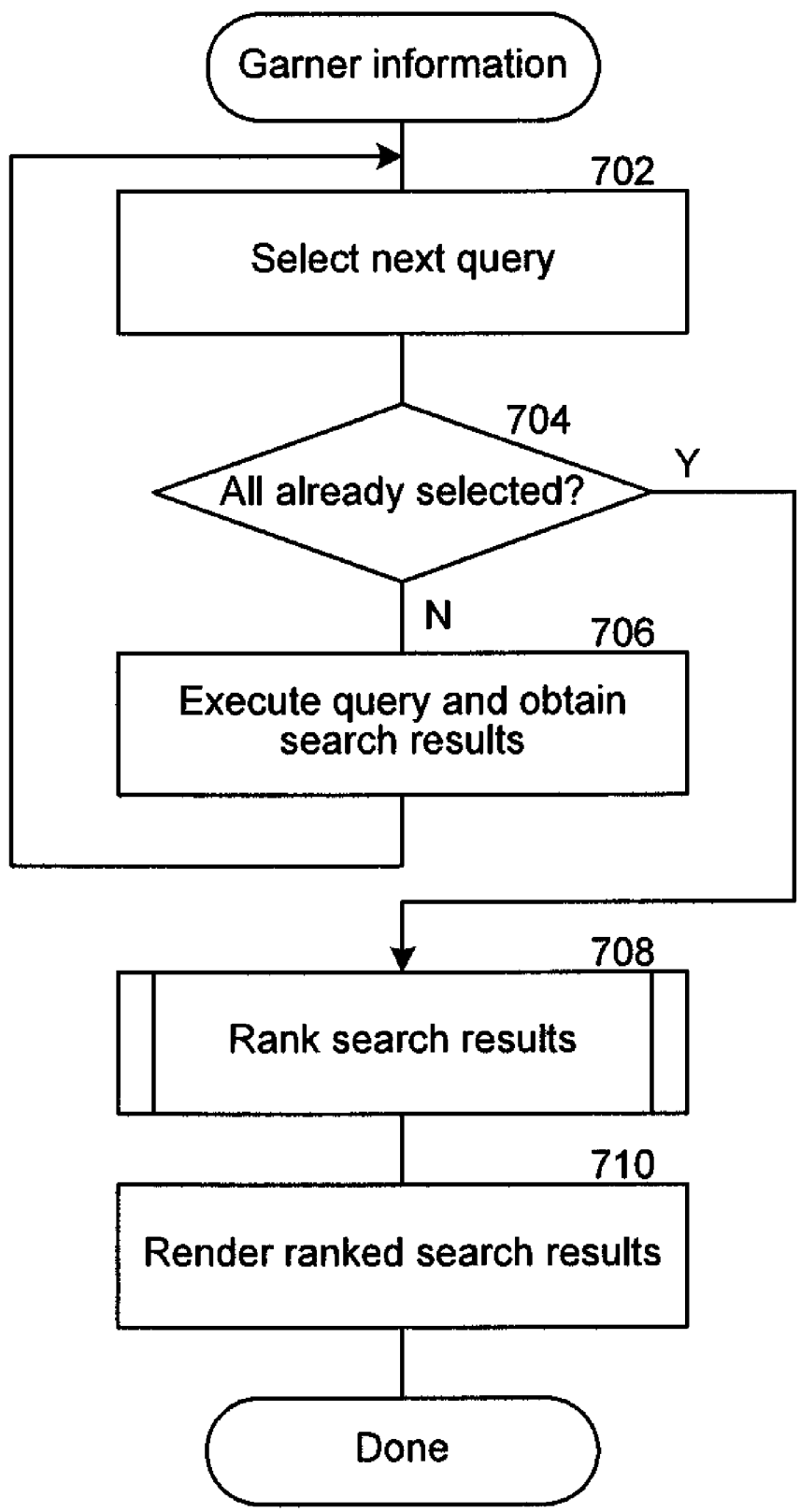
FIG. 7 is a flow diagram that illustrates the processing of the information garnerer component, according to some embodiments.

FIG. 7 is a flow diagram that illustrates the processing of the information garnerer component, according to some embodiments. The information garnerer component periodically garners information for rendering to a user based on the information contained in the user's profile. In block 702, the garnerer component selects the next query from the user's profile. In decision block 704, if all of the queries have already been selected, then the garnerer component continues at block 708, else the garnerer component continues at block 706. In block 706, the garnerer component executes the query and obtains the search results. The garner component may execute the query by searching the information sources specified in the user's profile using the query. Subsequent to obtaining the search results for the query, the garnerer component loops to block 702 to select the next query. In block 708, the garnerer component ranks the search results which were obtained by executing the queries. In block 710, the garnerer component renders the ranked search results to the user, and completes.

Figure 8:
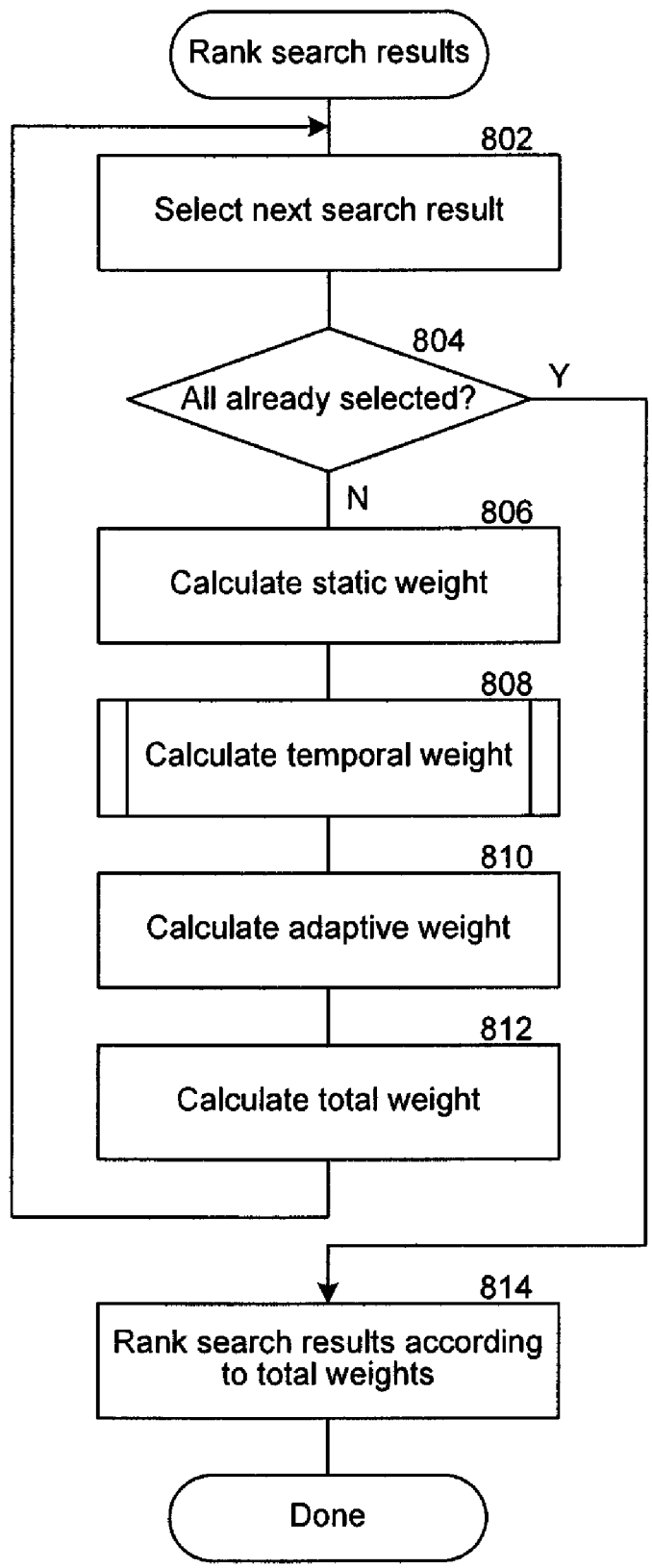
FIG. 8 is a flow diagram that illustrates the processing of the ranker component, according to some embodiments.

FIG. 8 is a flow diagram that illustrates the processing of the ranker component, according to some embodiments. The ranker component is passed the search results (the information items resulting from a search of an information source) and ranks the search results based on a total weight assigned to each search result. In block 802, the ranker component selects the next search result. In decision block 804, if all of the search results have already been selected, then the ranker component continues at block 814, else the ranker component continues at block 806. In block 806, the ranker component calculates a static weight for the search result. In block 808, the ranker component calculates a temporal weight for the search result. In block 810, the ranker component calculates an adaptive weight for the search result. In block 812, the ranker component calculates a total weight based on the static weight, temporal weight, and the adaptive weight, assigns the total weight to the search result, and then loops to block 802 to select the next search result. In block 814, the ranker component ranks the search results based on the total weights assigned to the search results, and completes.

Figure 9:
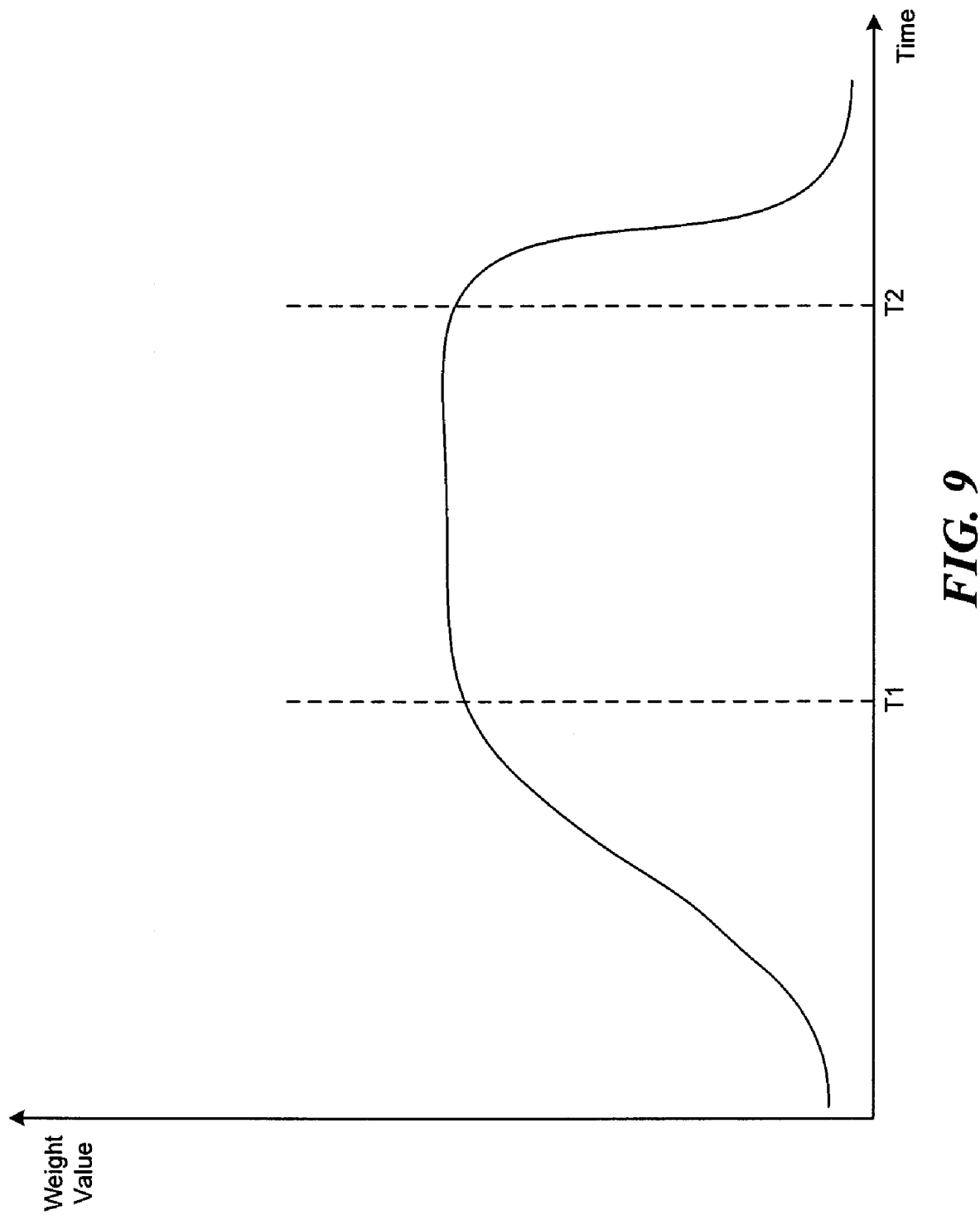
FIG. 9 is a graphical depiction of weight values as a function of proximity to an event, according to some embodiments.

FIG. 9 is a graphical depiction of weight values as a function of proximity to an event, according to some embodiments. The graph illustrates the temporal weight value, which is the importance of an item of information (i.e., search result) to a user, relative to time. The relative importance of the item of information varies differently depending on the current time. In the graph depicted in FIG. 9, T1 is the scheduled start time of the event related to the item of information, and T2 is the scheduled end time of the related event. In the time period before T1, the importance of the item of information to the user rises, for example, exponentially as depicted in FIG. 9, but with a shallow upward curve as the current time approaches closer to T1. During the event, the importance of the item of information to the user remains relatively flat. During the time after the end of the event, the importance of the item of information to the user quickly drops, for example, exponentially as depicted in FIG. 9, so that the importance diminishes to a value of zero in a very short amount of time.

Figure 10:
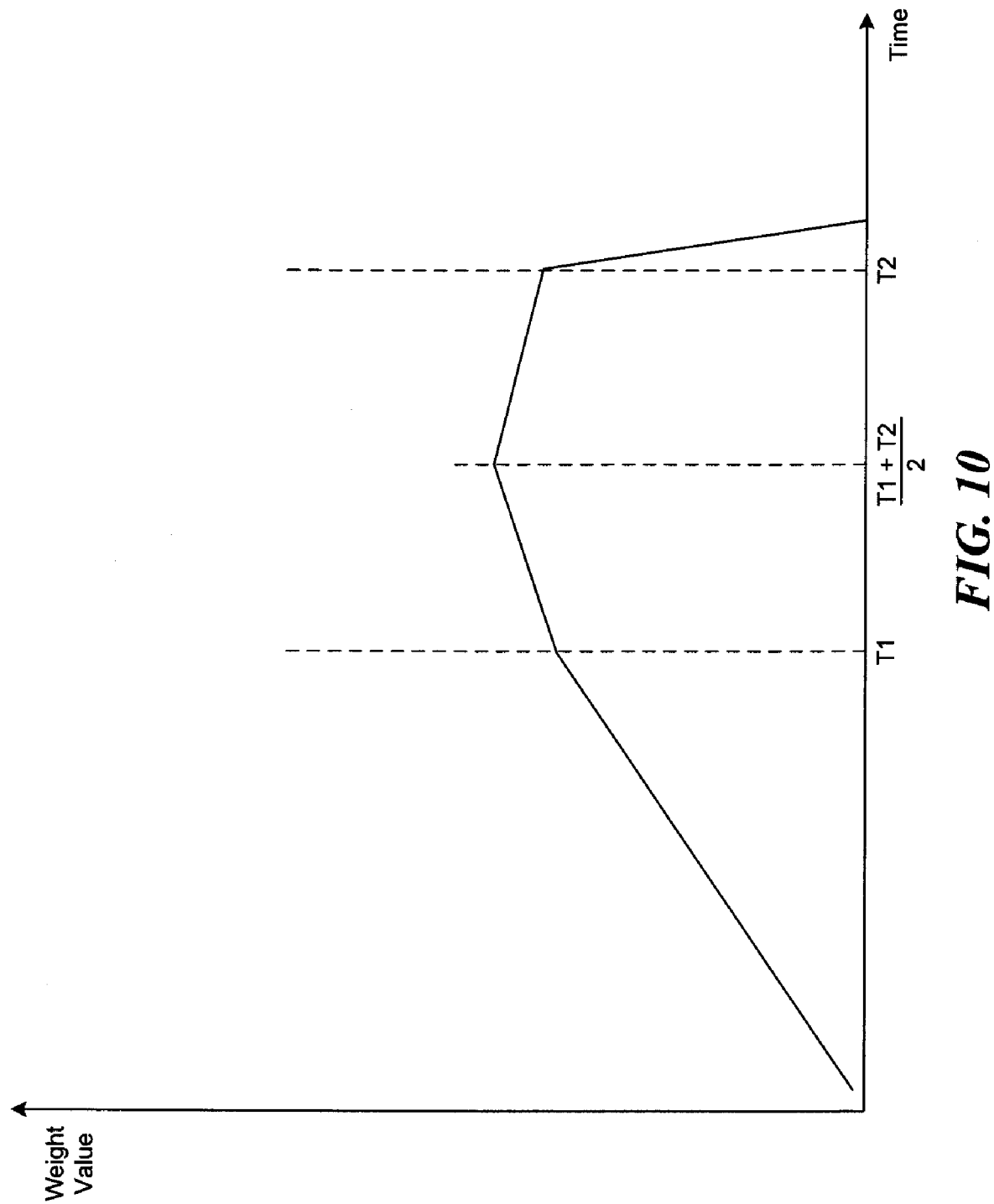
FIG. 10 is a graphical depiction of weight values as a function of proximity to an event, according to some embodiments.

In some embodiments, as depicted in FIG. 10, the importance of the item of information to the user during the event can rise to a peak at a point in time during the event, for example at time (T1+T2)/2, and decrease thereafter to the scheduled end of the event.

Figure 11:
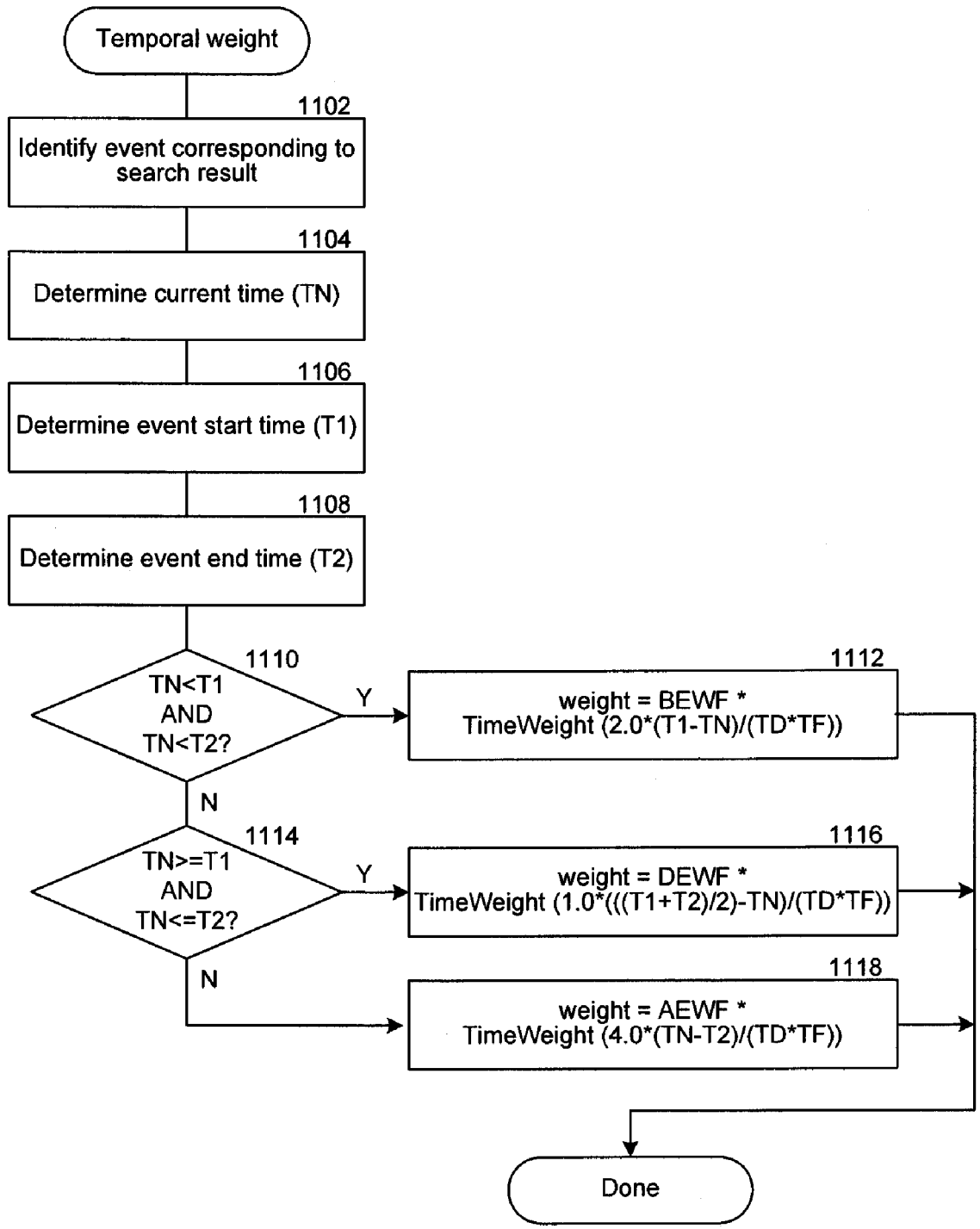
FIG. 11 is a flow diagram that illustrates the processing of the ranker component to calculate a temporal weight of a search result, according to some embodiments.

FIG. 11 is a flow diagram that illustrates the processing of the ranker component to calculate a temporal weight of a search result, according to some embodiments. In block 1102, the ranker component identifies the event that corresponds to the search result. In block 1104, the ranker component determines the current time (i.e., the time at the present). In block 1106, the ranker component determines the time the identified event is scheduled to start. In block 1108, the ranker component determines the time the identified event is scheduled to end. In decision block 1110, if the current time is before the time the event is scheduled to start, then the ranker component continues at block 1112, else the ranker component continues at decision block 1114. In block 1112, the ranker component calculates a temporal weight for the search result using Equation 3, and completes. In decision block 1114, if the current time is between the time the event is scheduled to start and the time the event is scheduled to end, then the ranker component continues at block 1116, else the ranker component continues at block 1118. In block 1116, the ranker component calculates a temporal weight for the search result using Equation 4, and completes. In block 1118, the ranker component calculates a temporal weight for the search result using Equation 5, and completes.

Figure 12:
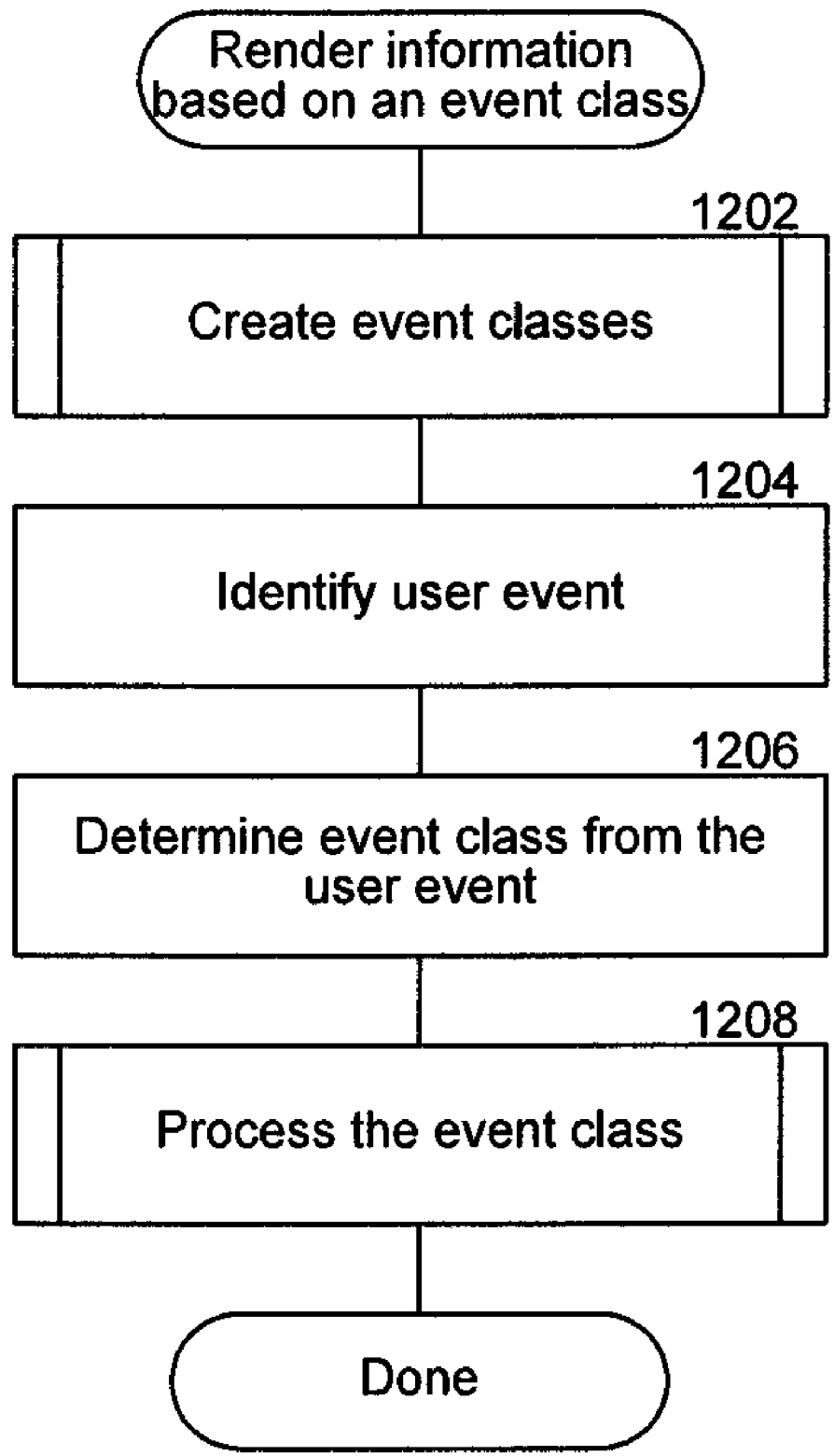
FIG. 12 is a flow diagram that illustrates the rendering information based on an event class corresponding to a user event, according to some embodiments.

FIG. 12 is a flow diagram that illustrates the rendering information based on an event class corresponding to a user event, according to some embodiments. The information dissemination system creates event classes and disseminates information related to topics extracted from the event classes. In block 1202, a component of the information dissemination system creates event classes. In block 1204, the component identifies a user event to process. In block 1206, the component determines an event class that corresponds to the identified user event. In block 1208, the component processes the identified event class, and completes.

Figure 13:
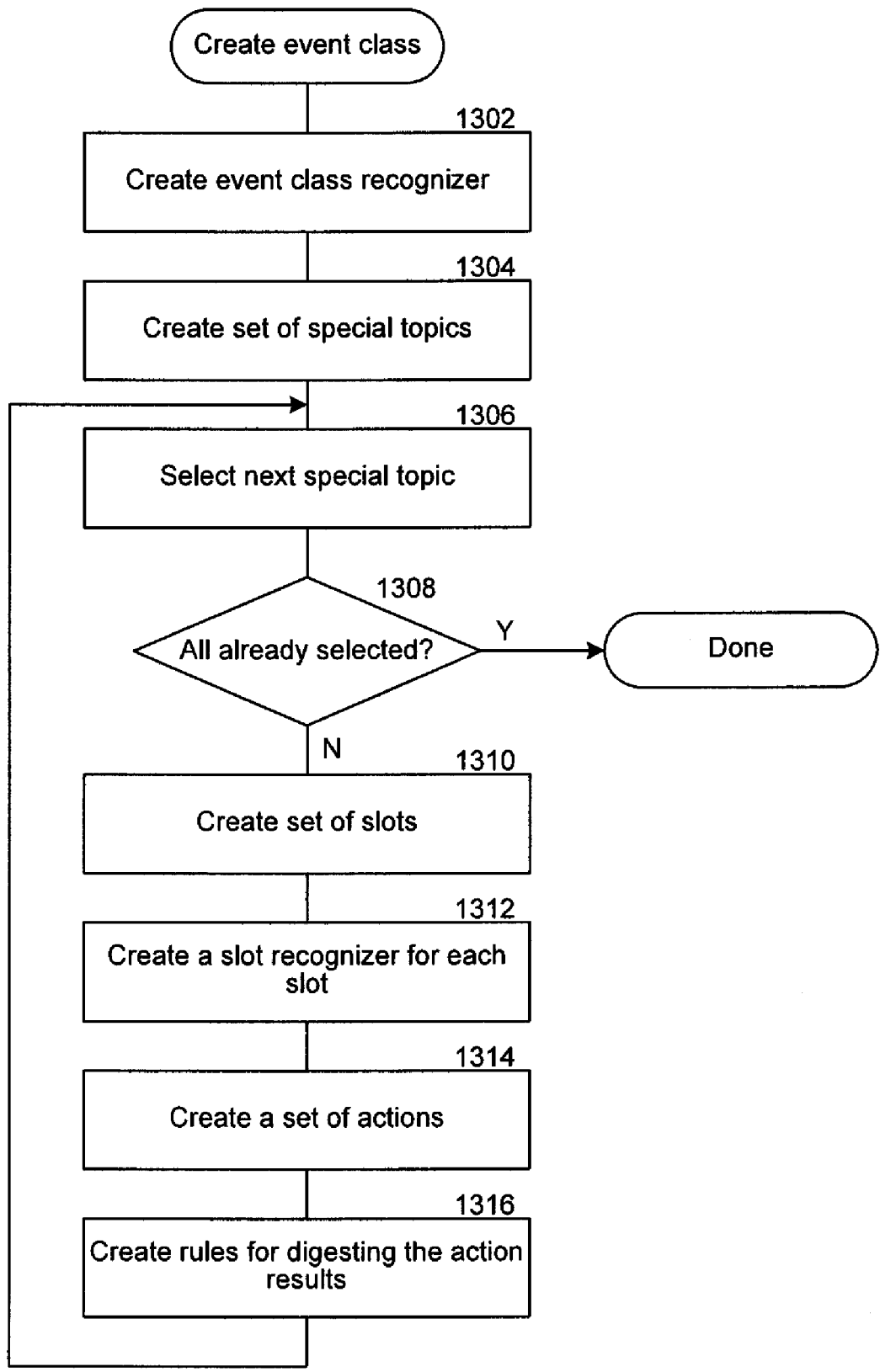
FIG. 13 is a flow diagram that illustrates the creating of an event class, according to some embodiments.

FIG. 13 is a flow diagram that illustrates the creating of an event class, according to some embodiments. A component of the information dissemination system may create an event class in response to a user request to create an event class and based upon input provided by the user. In block 1302, the component creates an event class recognizer for the event class. In block 1304, the component creates a set of special topics for the event class. In block 1306, the component selects the next special topic. In decision block 1308, if all of the special topics have already been selected, then the component completes, else the component continues at block 1310. In block 1310, the component creates a set of slots for the special topic. In block 1312, the component creates a slot recognizer for each of the created slots. In block 1314, the component creates a set of actions for the special topic. In block 1316, the component creates a set of rules for digesting the action results to extract the relevant information from the action results, and then loops to block 1306 to select the next special topic.

FIG. 14 is an example data listing that illustrates an event class, according to some embodiments. The listing illustrates a plurality of special topics contained in the event class, including a "Travel advisory topic" section 1402 for a travel advisory special topic. The travel advisory topic section contains a "Slots" section 1404, a "Recognizers" section 1406, and an "Action" section 1408. The slots section specifies the slots that have been defined for the special topic. For example, the slots "ToCity" and "ToCountry" have been defined for the travel advisory topic. The recognizers section specifies the restrictions on the values of the slots and how to determine the values for the slots. The action section specifies the actions that are to be taken for the special topic. For example, the actions may be specified in the form of parameterized URLs to be displayed or executed. The listing in FIG. 14 also illustrates other special topics which have not been illustrated to the same level of detail as the travel advisory special topic. Although not depicted, each of these special topics may also contain sections similar to those contained in the travel advisory special topic.

Figure 15:
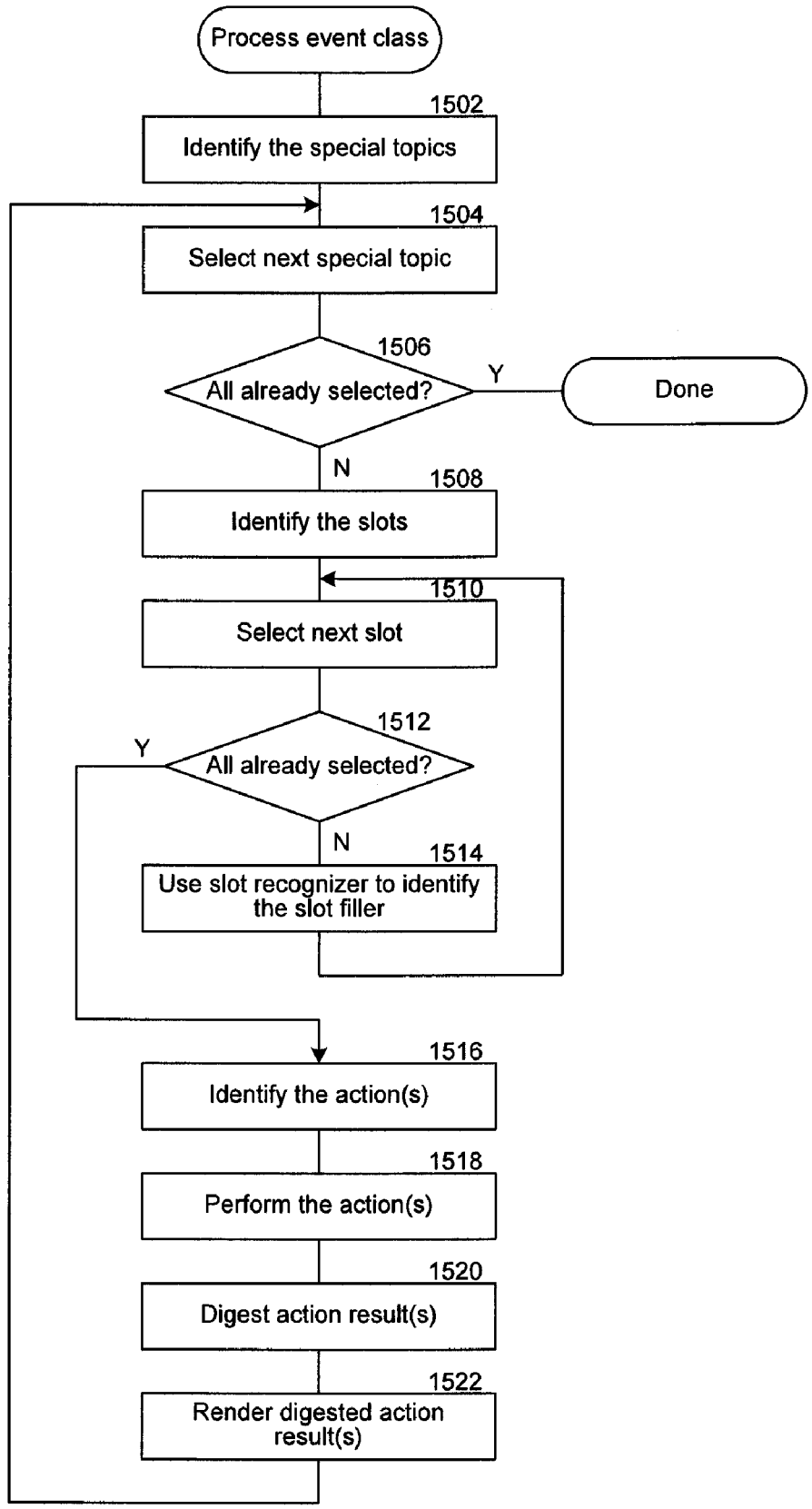
FIG. 15 is a flow diagram that illustrates processing an event class, according to some embodiments.

FIG. 15 is a flow diagram that illustrates processing an event class, according to some embodiments. A component of the information dissemination system may process an event class upon identifying a user event to process. In block 1502, the component identifies the special topics that have been defined (i.e., created) for the event class. In block 1504, the component selects the next defined special topic. In decision block 1506, if all of the defined special topics have already been selected, then the component completes, else the component continues at block 1508. In block 1508, the component identifies the slots that have been defined for the special topic. In block 1510, the component selects the next defined slot. In decision block 1512, if all of the defined slots have already been selected, then the component continues at block 1516, else the component continues at block 1514. In block 1514, the component uses the slot recognizer for the slot to identify the slot filler (and a value) for the slot, and then loops to block 1510 to select the next defined slot. In some embodiments, in instances where the component is unable to identify the slot filler, the component may request the user to provide the slot filler. In block 1516, the component identifies the actions that have been defined for the special topic. In block 1518, the component performs the actions. In block 1520, the component digests the action results, for example, to identify the relevant information. In block 1522, the component renders the digested action results to the user, and then loops to block 1504 to select the next defined special topic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer-implemented method performed by a computer having a memory and a processor for disseminating contextually relevant information based on user interests, the method comprising:
identifying user interests of a user by extracting terms from files associated with the user;
automatically generating a user profile based on the user interests by,
generating clusters of similar terms from the extracted terms,
associating at least one cluster with each of a plurality of events associated with the user, and
for each event associated with the user,
for each identified cluster associated with the event,
identifying key terms in the cluster,
generating a query from the key terms,
generating a tome that includes the generated query and event information associated with the event, and
placing the generated topic in the user profile so that the user profile comprises key terms derived from terms extracted from the user interests and at least one query generated from one or more key terms; and
periodically generating information for rendering to the user by,
for each topic in the user profile, obtaining search results by executing each query associated with the topic against information sources,
for each search result,
identifying an event associated with the search result,
calculating a static weight for the search result,
calculating a temporal weight for the search result based at least in part on the proximity of the identified event associated with the search result to the current time,
calculating an adaptive weight for the search result based at least in part on a user preference of the user,
calculating a total weight for the search result based at least in part on the static, temporal, and adaptive weights, and
ranking the search results based on the total weight calculated for each search result, and
rendering the ranked search results to the user
wherein the generating and garnering are performed by the processor executing instructions stored in the memory.

2. The method of claim 1, wherein at least one user interest is identified from an appointment of the user.

3. The method of claim 1, wherein at least one user interest is identified from an email of the user.

4. The method of claim 1, wherein the key terms are derived based on overall weights corresponding to the terms.

5. The method of claim 4, wherein the overall weight corresponding to a term is based in part on a frequency of the term.

6. The method of claim 4, wherein the overall weight corresponding to a term is based in part on a weight of the term.

7. The method of claim 4, wherein the overall weight corresponding to a term is based in part on a relevance of the term to the user interests.

8. The method of claim 1 further comprising:
receiving feedback from the user regarding the rendered search results; and
incorporating the feedback into the user profile as user interests.

9. A computer-readable medium containing computer-executable instructions that when executed by a processor of a computer system cause the computer system to perform a method for adaptively disseminating contextually relevant information based on user interests of a user, the method comprising:
identifying user interests from clusters of terms extracted from one or more user emails, each cluster of terms corresponding to a set of similar terms;
identifying a user event;
identifying topics based on the user event;
for each topic,
identifying clusters of terms for the topic;
for each of the identified clusters of terms, identifying key terms in the cluster by,
selecting a term in the cluster,
calculating a type weight for the selected term,
calculating a relevance weight for the selected term, calculating an overall weight for the selected term based at least in part on the calculated type and relevance weights, and if the overall weight exceeds a predetermined threshold, identifying the selected term as a key term; and generating a query based on the key terms;

obtaining search results by executing the queries associated with each topic against information sources;

ranking the search results; and rendering the ranked search results to the user.

10. The computer-readable medium of claim 9, wherein the overall weight of a term is based in part on a frequency of the term in the clusters of terms.

11. The computer-readable medium of claim 9, wherein the overall weight of a term is based in part on a weight of the term in the clusters of terms.

12. The computer-readable medium of claim 9, wherein the relevance weight of a term is based in part on a relevance of the term in the clusters of terms to the user interests.

13. The computer-readable medium of claim 9 further comprising:

receiving feedback from the user regarding the rendered search results; and incorporating the feedback into the user interests.

14. The computer-readable medium of claim 9, wherein the query is based at most on the six highest ranked key terms according to overall weight.

15. The computer-readable medium of claim 9, wherein the search results are ranked based in part on static weights corresponding to the search results.

16. The computer-readable medium of claim 9, wherein the search results are ranked based in part on adaptive weights corresponding to the search results.

17. The computer-readable medium of claim 9, wherein ranking the search results includes:

calculating a static weight for each search result;

calculating a temporal weight for each search result;

calculating an adaptive weight for each search result;

calculating a total weight for each search result based at least in part on the static, temporal, and adaptive weights; and ranking the search results based on the total weights of each search result.

18. An information dissemination system comprising:

a profiler component that executes on a client and that identifies user interests, that derives key terms from terms extracted from the user interests, and that generates queries from one or more of the key terms, wherein the key terms are derived based on the relevance of the terms to the user interests;

an information garnerer component that executes on a server and that obtains search results from executing the queries against information sources;

a ranker component that executes on the server and that ranks the search results by, calculating a static weight for each search result, calculating a temporal weight for each search result, calculating a total weight for each search result based at least in part on the static and temporal weights, and ranking the search results based on the total weight of each search result; and a renderer component that executes on the server and that renders the ranked search results for viewing.

19. The system of claim 18 further comprising a feedback component that executes on the server and that incorporates feedback regarding the search results into the user interests.

20. The system of claim 18, wherein calculating a temporal weight for a search result includes:

identifying an event associated with the search result;

determining a current time;

determining a start time for the event;

determining an end time for the event;

when the current time is earlier than the determined end time, calculating a temporal weight based at least in part on the difference between the current time and the start time; and when the current time is later than the determined end time, calculating a temporal weight based at least in part on the difference between the current time and the determined end time.

* * * * *

UNITED STATES PATENT AND TRADEMARK OFFICE
CERTIFICATE OF CORRECTION

PATENT NO. : 7,577,718 B2  
APPLICATION NO. : 11/461388  
DATED : August 18, 2009  
INVENTOR(S) : Slawson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 509 days.

Signed and Sealed this

Seventh Day of September, 2010

David J. Kappos  
*Director of the United States Patent and Trademark Office*